US005485963A

United States Patent [19]
Walto et al.

[11] Patent Number: 5,485,963
[45] Date of Patent: Jan. 23, 1996

[54] GRANULAR FERTILIZER SPREADER

[75] Inventors: Joseph J. Walto, Carver; Nathan J. Friberg, Bloomington; Floyd D. Niskanen, Golden Valley, all of Minn.

[73] Assignee: The Toro Company, Bloomington, Minn.

[21] Appl. No.: 241,261

[22] Filed: May 11, 1994

[51] Int. Cl.⁶ .................................................. A01C 15/00
[52] U.S. Cl. .......................... 239/663; 239/1; 239/504; 239/553.5; 239/670; 222/623; 56/16.8
[58] Field of Search .......................... 222/610, 623–625; 239/689, 650, 670, 498, 521, 663, 1, 504, 553.5, 590.5; 56/16.8, DIG. 4

[56] References Cited

U.S. PATENT DOCUMENTS

| Re. 3,278 | 1/1869 | Stevens et al. | 222/164 |
|---|---|---|---|
| Re. 32,067 | 1/1986 | Emory | 56/16.8 |
| 1,332,006 | 2/1920 | Schadt et al. | 56/25.4 |
| 1,618,443 | 2/1927 | Knight | 222/177 |
| 1,644,575 | 10/1927 | Fitz Gerald | 239/650 X |
| 1,876,409 | 9/1932 | Gordon | 56/25.4 |
| 1,988,115 | 1/1935 | Elphinstone | 29/148.3 |
| 2,639,571 | 5/1953 | Kelly | 56/249 |
| 2,678,145 | 5/1954 | Luzwiak et al. | 222/625 X |
| 2,742,751 | 4/1956 | Laughlin | 56/229 |
| 2,792,970 | 5/1957 | Gaiman | 222/625 X |
| 2,819,826 | 1/1958 | Kirschmann | 222/625 X |
| 2,847,224 | 8/1958 | Stout | 275/8 |
| 2,861,611 | 11/1958 | Considder | 56/16.8 X |
| 2,878,633 | 3/1959 | Mullin | 56/25.4 |
| 2,940,640 | 6/1960 | Erickson | 222/177 |
| 2,966,023 | 12/1960 | Carpenter | 56/25.4 |
| 2,973,884 | 3/1961 | Peoples et al. | 222/625 |
| 2,974,963 | 3/1961 | McBride | 275/2 |
| 2,991,914 | 7/1961 | Janssen, Jr. | 222/171 |
| 3,021,642 | 2/1962 | Ewing | 47/1.5 |
| 3,021,983 | 2/1962 | Blocksom | 222/191 |
| 3,023,562 | 3/1962 | Slack | 56/25.4 |
| 3,100,371 | 8/1963 | Redmon | 56/25.4 |
| 3,102,375 | 9/1963 | Troka et al. | 56/255 |
| 3,332,221 | 7/1967 | McCain | 56/295 |
| 3,334,475 | 8/1967 | Danisch | 56/25.4 |
| 3,359,710 | 12/1967 | Anderson | 56/25.4 |
| 3,375,644 | 4/1968 | Harper | 56/25.4 |
| 3,405,514 | 10/1968 | Pulrang | 56/25.4 |
| 3,477,212 | 11/1969 | Coffman | 222/625 X |
| 3,534,533 | 10/1970 | Luoma | 56/25.4 |
| 3,857,515 | 12/1974 | Zennie | 239/169 |
| 3,942,308 | 3/1976 | Vicendese et al. | 56/16.8 |
| 4,185,780 | 1/1980 | Duchene et al. | 239/553.5 |
| 4,242,855 | 1/1981 | Beaver, Jr. | 56/13.7 |
| 4,971,255 | 11/1990 | Conrad | 239/553.5 X |
| 5,385,306 | 1/1995 | Cervenka | 239/663 |

FOREIGN PATENT DOCUMENTS

| 209062 | 1/1987 | European Pat. Off. | 239/689 |
|---|---|---|---|
| 1582289 | 9/1975 | Germany | 56/16.8 |
| 445381 | 8/1948 | Italy | 222/623 |
| 187910 | 10/1953 | Sweden | 239/650 |

*Primary Examiner*—Kevin P. Weldon
*Attorney, Agent, or Firm*—David George Johnson

[57] ABSTRACT

A granular fertilizer spreader which may be attached to a lawn mower (1). The spreader includes a hopper (44) which is secured to the mower handle (3), the spreader including drive wheels (9,10) which frictionally engage the rear mower wheels (7,8). An impeller (99) is rotated by the drive wheels (9,10), thereby urging fertilizer or other granular material contained within hopper (44) to exit through a series of orifices (73–84) located along the bottom surface (54) of the hopper (44). A discharge chute (134) entrains the fertilizer as it exits the orifices (73–84) and guides the fertilizer along a series of open channels (138–149), each channel terminating with an outlet orifice (152–163) through which the fertilizer is ultimately deposited upon the ground behind the mower deck (2). The drive wheels (9,10) are urged into positive frictional contact with the mower wheels (7,8) by a spring (187) that is secured to the mower handle (3) at a user selected point by a clamp (196).

11 Claims, 11 Drawing Sheets

GRANULAR FERTILIZER SPREADER

BACKGROUND OF THE INVENTION

1. Field of the Invention

This invention is generally directed to implements or attachments for use with "walk behind" yard maintenance devices, such as lawn mowers or snowthrowers, either powered or completely manual. More specifically, the present invention sets forth the combination of a hopper and chute which may be used to distribute a granular lawn care protect, such as fertilizer, in a controlled manner during the normal use of the lawn mower while engaged in mowing a lawn.

2. Related Technology

One such device of which the applicant is aware is disclosed in U.S. Pat. No. Re. 32,067, issued to Emory. The '067 patent discloses a hopper supported at each end by drive wheels which are vertically aligned with and which engage the rear wheels of a conventional lawn mower. As the mower 1s pushed or mechanically driven across the ground, the rear wheels rotate, and being in frictional contact with the hopper drive wheels, cause the drive wheels to rotate. The hopper drive wheels are linked to an agitator residing near the bottom of the hopper which urges fertilizer contained within the hopper to fall through a slot located along the bottom of the hopper.

The '067 patent further discloses a series of funnels that are permanently affixed to the bottom of the hopper slot such that all of the material falling through the slot is captured by one of the funnels. The outlet of each funnel is attached to a flexible tube with an outlet end which can be adjustably positioned along a perforated horizontal splash plate.

The shortcomings of the '067 device are several. First, in an effort to build a spreader which can be adapted "to all lawn mower widths", considerable mechanical complexity is introduced All attachment hardware must be individually adjusted for each lawn mower deck/handle/width/height configuration, and the discharge tubes must be individually routed to avoid both interference with the lawn mower handle and to provide the desired width of fertilizer distribution.

Second, the '067 device discharges fertilizer in response to any movement of the lawn mower rear wheels, regardless of whether the lawn mower 1s moving forward or in reverse. In mowing a typical lawn, there is considerable reverse movement of the lawn mower when mowing in the vicinity of bushes, trees and other commonly encountered obstacles. The '067 device therefore distributes a disproportionately large amount of fertilizer in the region of lawn obstacles and during turning maneuvers.

Third, the '067 device requires frequent labor intensive maintenance. Insofar as the lawn mower represents a machine which encounters frequent shock and near constant vibration in an atmosphere filled within fine particles, the '067 device, with its numerous chains, brackets and clamps, must be retightened and readjusted frequently. The outlet tube/funnel assemblies are subject to clogging and cracking, and may need individual cleaning, replacement and readjustment. The funnel/outlet tube arrangement results in variable residence times and discharge rates for the fertilizer depending on which particular funnel is encountered upon leaving the hopper.

Fourth, installation requires the use of two special wheel mount tools which must be affixed to the rear mower wheels prior to installation of the '067 device onto a lawn mower deck, and which must be removed after installation of the device is complete.

Fifth, the spreader plate of the '067 device is yet another mechanical component requiring separate mounting and adjustment for each individual lawn mower. Its nominally flat, horizontal configuration results in a disproportionate quantity of fertilizer being distributed over each side edge of the plate even when the plate is perfectly flat. When the mower 1s tilted for any reason, which is frequent in actual lawn mower operation, an even greater quantity of fertilizer is "dumped" over the lower of the two side edges, resulting in a concentration of fertilizer at the edges of the mower path, an effect which is exaggerated by succeeding passes of the lawn mower.

Problems such as the aforementioned explain in large part why the fertilizer spreader has yet to become a commonly used attachment on the typical lawn mower.

Other references of interest include U.S. Pat. No. 1,876,409, issued to Gordon, which discloses a fertilizer and seed spreader attachment for a rotary push type mower. The spreader mounts directly on the reel mower and includes a hopper for holding granular materials. The hopper includes an adjustable opening at its bottom through which the granular materials drop. A generally cylindrical distributing mechanism disperses the falling granular material ahead of the reel mower. The cylindrical distributor is driven by intermediate wheels that contact the large reel mower wheels. The intermediate wheels drive the driven wheels that are mounted on the same shaft as the cylindrical distributor. The driven wheels include clutches that permit transmission of power to the cylindrical distributor when the reel mower 1s pushed in a forward direction but stop transmission of power to the distributor when the reel mower 1s pulled in a rearward direction. The intermediate wheels can be pivoted away from the reel mower wheels and the driven wheels can be pivoted so that they are in direct contact with the reel mower wheels. When the wheels are positioned in that configuration, the spreader attachment will operate when the reel mower 1s pulled backward but, of course, the reel cutting blades will not rotate. Gordon does not disclose a spreader plate with channels nor does Gordon disclose a simplified means for mounting the attachment onto the mower.

U.S. Pat. No. Re. 3,278, issued to Stevens et al. discloses a seed planter with a spreader plate that includes channels wherein the spreader plate and channels are relatively narrow at the top and are significantly wider at the bottom. Alternative spreader plate designs are shown in FIGS. 4–7 of Stevens et al.

U.S. Pat. No. 1,988,115, issued to Elphingstone, discloses a spreader attachment for a truck wherein the spreader plate includes a series of adjacent channels for distributing a generally granular material.

U.S. Pat. No. 1,322,006, issued to Schadt et al., discloses a scatterer-unloader that includes a spreader plate with side by side channels for distributing a generally granular material.

U.S. Pat. No. 2,974,963, issued to McBride, discloses a fertilizer spreader attachment for lawn mowers that includes a disposable hopper filled with granular material that mounts on the mower. The hopper includes an adjustable opening at the bottom of the hopper through which the granular material is dropped. Material is dispensed when the mower 1s pushed over the ground which causes the hopper to vibrate which, in turn, causes the granular material to be dispensed from the hopper.

U.S. Pat. No. 1,618,443, issued to Knight, discloses a spreader plate on a wheelbarrow that diverges as it extends down and away from the wheelbarrow. The spreader plate also includes guide ridges to help distribute the material evenly over the plate.

U.S. Pat. No. 3,477,212, issued to Coffman, discloses a lawn mower fertilizer spreader attachment that includes a hopper mounted directly on the lawn mower. The attachment includes a wheel that is driven by one of the lawn mower wheels. The driven wheel is connected to and drives an agitator within the hopper that helps to deliver granular fertilizer to a discharge spout that drops the fertilizer into the cutting deck of the mower. An adjustable plate located adjacent to the outlet of the hopper controls the volume of flow through the discharge spout. Coffman does not disclose a clutch wherein the delivery of the granular fertilizer is stopped when the mower 1s pulled in a rearward direction.

U.S. Pat. No. 3,942,308, issued to Vicendese et al. discloses a lawn mower fertilizer spreader attachment that includes a hopper mounted directly on the lawn mower. The hopper is mounted directly over the rear axle of the lawn mower and includes an agitator at the bottom of the hopper that has a drive shaft concentrically affixed to the rear wheel.

U.S. Pat. No. 3,100,371, issued to Redmon, discloses a lawn mower fertilizer spreader attachment that includes a hopper mounted directly on the mower. The attachment includes a wheel that is driven by one of the lawn mower wheels. The driven wheel is connected to and drives an agitator within the hopper that helps to deliver granular fertilizer through the discharge opening into the mower deck. In alternate embodiments, Redmon discloses lawnmowers with similar fertilizing attachments that disperse the granular fertilizer into the cutting chamber of the lawn mower. Redmon does not disclose a clutch wherein the delivery of granular fertilizer is stopped when the mower 1s pulled backwards.

U.S. Pat. No. 3,102,375, issued to Troka et al., discloses a lawn mower fertilizer spreader attachment that includes a hopper mounted directly on the lawn mower. The hopper is mounted generally rearward of the rear mower wheels and includes an agitator at the bottom of the hopper that is driven by a pair of wheels that contact and are rotated by the rear mower wheels.

U.S. Pat. No. 3,375,644, issued to Harper, discloses a belt driven fertilizer spreader attachment for lawnmowers. One embodiment shows a fertilizer spreader attachment that is mounted on the front portion of the deck while another embodiment shows a similar attachment mounted on the handlebar assembly of the mower. Both embodiments have means for discharging the fertilizer through an opening in the deck. The drive belt system drives an agitator within the fertilizer spreader hopper.

U.S. Pat. No. 2,792,970, issued to Gaiman, discloses a fertilizer spreader attachment for a lawn mower that includes a hopper and a wheel driven agitator within the hopper to aid in the distribution of the fertilizer through an adjustable opening in the bottom of the hopper. The hopper can be pivoted away from the ground engaging wheel of the mower so that the agitator within the hopper is not driven.

Finally, U.S. Pat. No. 2,991,914, issued to Johnson, Jr., discloses a fertilizer spreader attachment that includes a rotating perforated drum that is rotated by a front ground engaging wheel of the lawn mower.

SUMMARY OF THE INVENTION

The present invention is directed to a fertilizer spreader which addresses many of the problems present in the prior art. The present invention includes a hopper mounted above the rear wheels of a conventional lawn mower, the hopper including an internally positioned impeller. The impeller is driven by a pair of wheel/tire assemblies that engage the mower rear wheels. A one way clutch assembly prevents movement of the impeller whenever the rear mower wheels are moved in a reverse direction, thereby preventing the undesired discharge of fertilizer over the same area of lawn which has already been fertilized.

Further, the present invention includes a much simpler, more rugged design which can be readily manufactured to accommodate various standard mower deck styles and widths.

The discharge chute is of a novel design which insures substantially equal fertilizer distribution across the entire width of the mower path. The outlet orifices residing adjacent to the lower edge of the discharge chute are of a novel design that insures uniform and complete dispensing of the fertilizer as the fertilizer leaves the hopper.

A novel impeller design is disclosed, which acts as a fertilizer shut off valve, promotes even distribution of fertilizer during turns and also resists clogging and jamming at the discharge outlet of the hopper. In one embodiment, the impeller includes helical vanes such that only a portion of each vane overlies the hopper discharge opening at any given moment. In another embodiment, the longitudinal axis of the impeller core is split, so that each half of the impeller is independently driven by one of the drive wheels that engage the lawn mower tires.

A universal mounting system is also disclosed, which provides a biasing force to the drive wheel axle, thereby maintaining contact between the drive wheels and the lawn mower tires during a variety of operating conditions.

These and other features and advantages of the invention will be more fully understood by reference to the Detailed Description which follows.

DETAILED DESCRIPTION OF THE PREFERRED EMBODIMENTS

Figure 1:
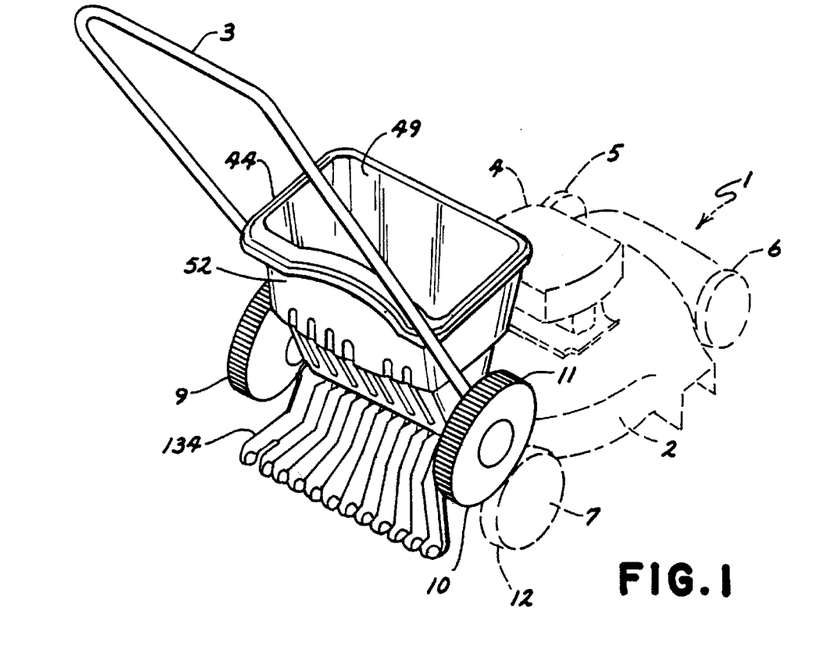
FIG. 1 is a perspective view of a fertilizer spreader constructed according to the principles of the present invention, shown mounted on a lawn mower.
Figure 10:
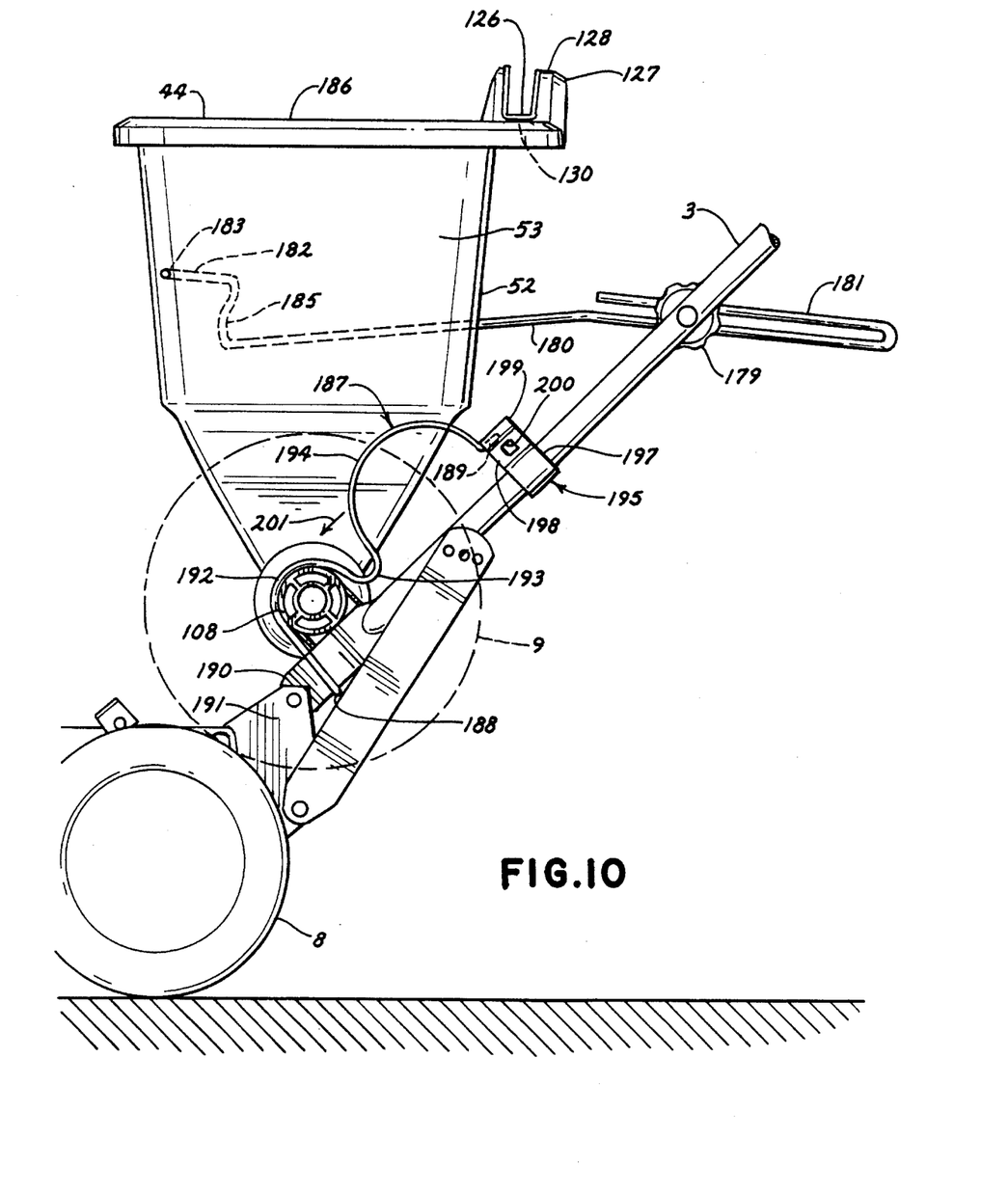
FIG. 10 is side elevation depicting the hopper of FIGS. 3–5 shown mounted in a use position with respect to a portion of a mower.
Figure 11:
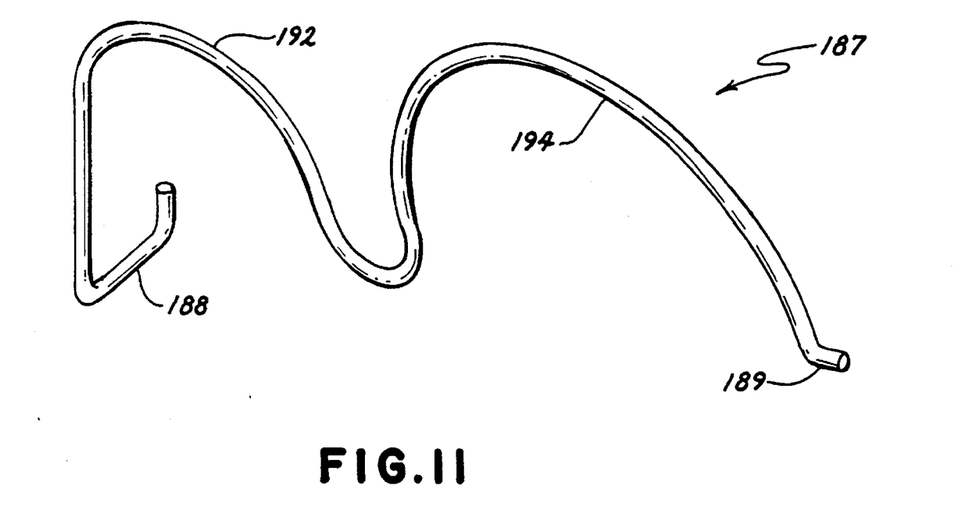
FIG. 11 is a perspective view of an attachment spring used to secure the apparatus of FIG. 2 to a mower.
Figure 12:
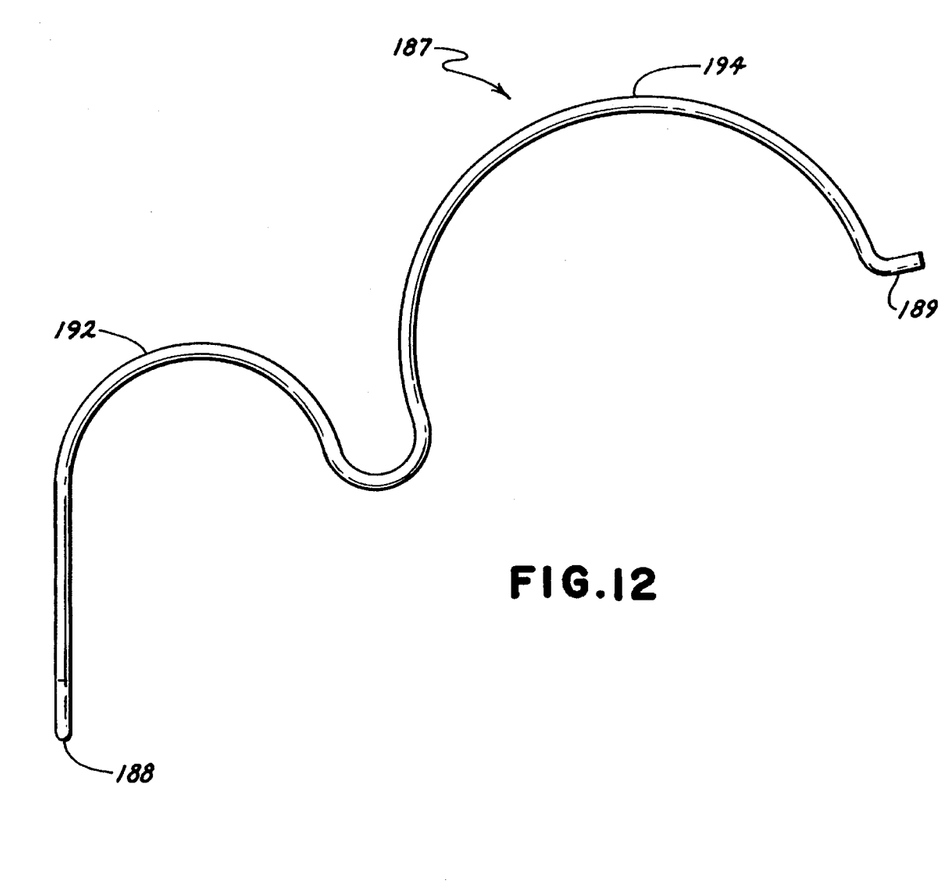
FIG. 12 is a side elevation of the attachment spring depicted in FIG. 11.
Figure 13:
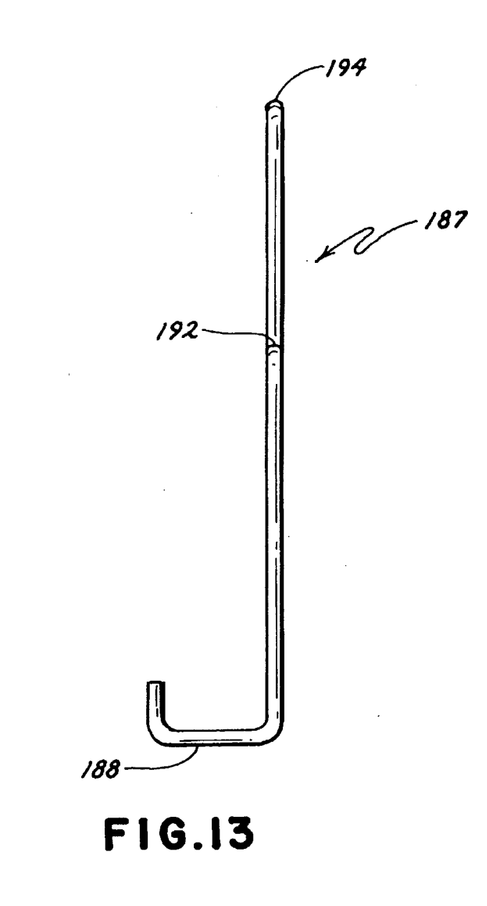
FIG. 13 is a front elevation of the attachment spring depicted in FIG. 11.

Referring particularly to FIGS. 1 and 10, a conventional lawn mower 1 is illustrated, including a mower deck 2 and handle 3. A gasoline engine 4 is rigidly mounted on mower deck 2, the engine 4 driving a blade (not shown) beneath mower deck 2. The mower deck is supported by four individual wheels 5,6,7 and 8, each wheel being located at a position approximately adjacent to a corner of the mower deck 2.

Figure 2:
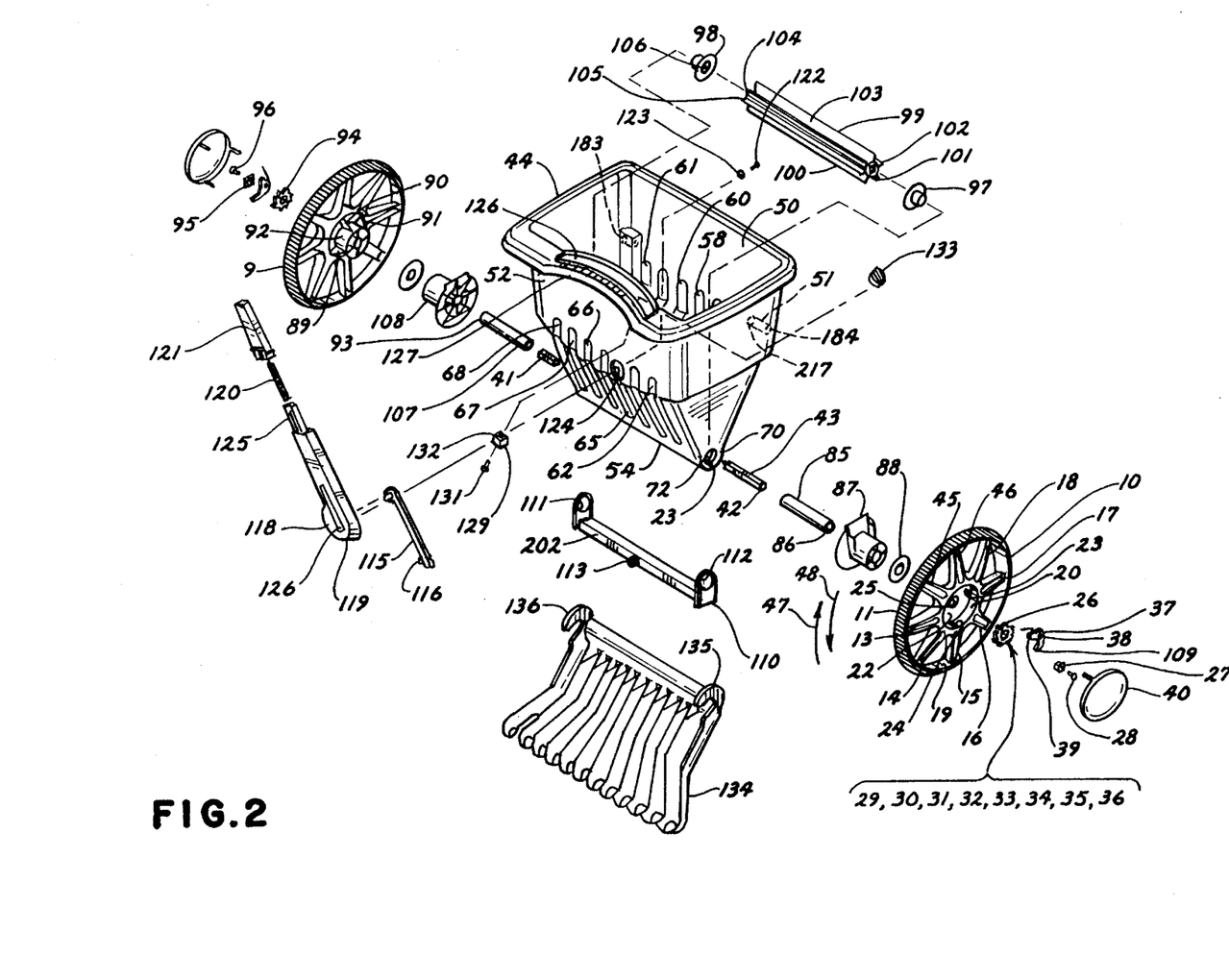
FIG. 2 is an exploded perspective view of the fertilizer spreader depicted in FIG. 1.

As can also be seen in FIG. 2, two additional wheels 9 and 10 are mounted so as to reside above and somewhat behind rear wheels 8 and 7, respectively, of the mower deck 2. Wheels 9 and 10 are substantially identical except for their location with respect to the mower deck, and the following description of wheel 10 is equally applicable to wheel 9, except as specifically noted.

Wheel 10 is formed of a plastic material such as polypropylene and includes an outer tread surface 11, the width of the tread surface 11 being somewhat narrower than the width of the tread surface 12 of mower wheel 7. When wheel 10 is mounted in its use position, the tread surface 11 contacts the underlying tread surface 12 of wheel 7. The coefficient of friction of the respective treads 11 and 12 may by itself be insufficient to cause rotation of overlying wheel 10 in response to the rotation of mower wheel 7 without substantial slippage between the two tread surfaces 11 and 12, and so a mounting system is utilized as will be later described. Further, failure to use an appropriate mounting system can result in wheel 10 advancing or "riding up" onto the mower wheel 7.

Wheel 10 is formed so as to have a series of spokes 13,14,15,16,17,18,45 and 46 which extend from the underside 19 of tread 11 so as to intersect substantially circular hub 20.

The hub 20 has a diameter of approximately two inches. The hub 20 is formed so as to have a side wall 21 having a width of approximately one inch as well as a bottom wall 22.

Centrally located within bottom wall 22 is an orifice 25 having a diameter of somewhat less than one inch. Mounted adjacent to bottom wall 22 and coaxially with orifice 25 is a gear 26, the gear 26 being rigidly secured in place by retainer 27 and screw 28. The gear 26 therefore rotates at the same angular rate as wheel 10. The gear 26 is formed so as to have a series of projecting teeth 30,31,32,33,34,35 and 36.

Mounted adjacent to inner hub wall 21 is a pawl 37, which is formed with a centrally located mounting orifice 38 suitably dimensioned so as to receive pin 23. When pin 23 is inserted into orifice 38, pawl 37 is free to pivot or rotate about pin 23. Pawl 37 is formed with a tooth 39 suitably dimensioned so that the tooth 39 will engage, for example, projecting tooth 29 when wheel 10 and therefore gear 26 is rotated in a first direction 48 corresponding to movement of the mower deck 2 in a forward direction. The tooth 39 is free to pass, without engagement, over all of the teeth 29–36 when the wheel 10 and therefore gear 26 is rotated in a second direction 47 corresponding to movement of the mower deck 2 in a rearward direction.

In one embodiment, the lower portion 109 of the pawl 37 is weighted or enlarged, thereby biasing the tooth 39 to contact the teeth 29–36 of gear 26. In an alternative embodiment, the tooth 39 is spring biased to accomplish the same result. A cap 40 is secured over hub 20 to protect gear 26 and pawl 37 from contamination. Hopper wheels 9 and 10 are mounted at opposite ends 41 and 42, respectively, of axle 43.

Figure 3:
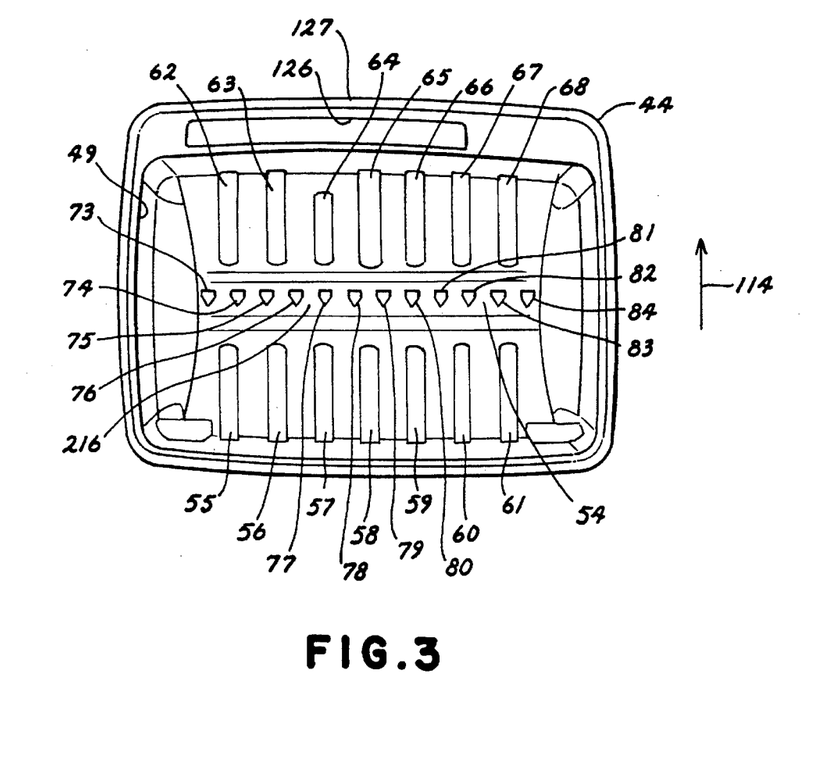
FIG. 3 is a plan view of the hopper as depicted in FIG. 1.
Figure 4:
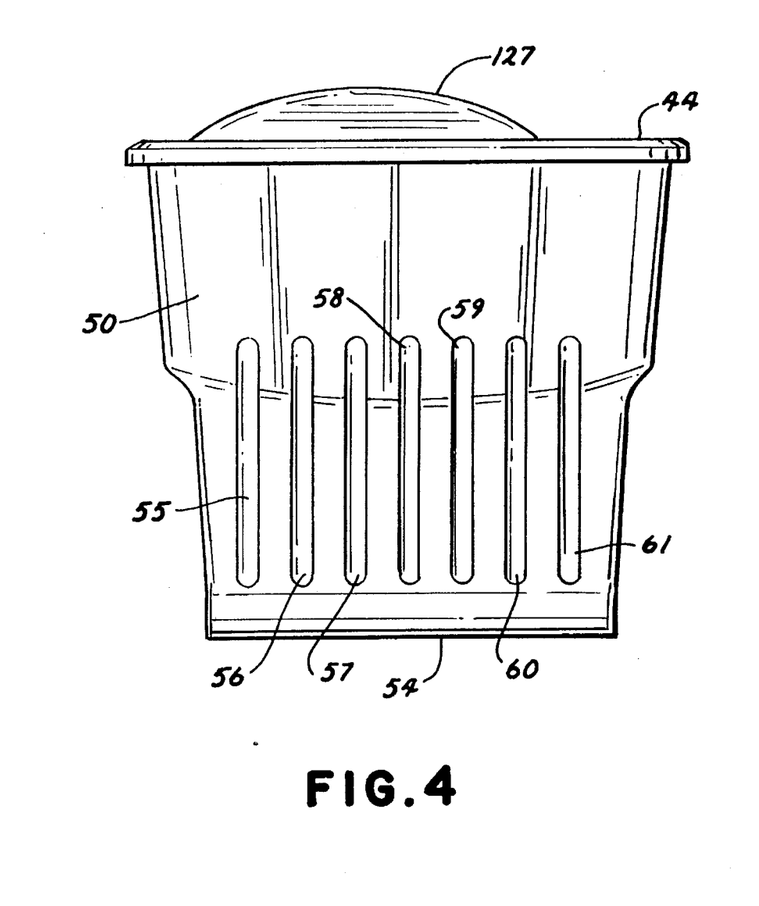
FIG. 4 is a front elevation of the hopper as depicted in FIG. 1.
Figure 5:
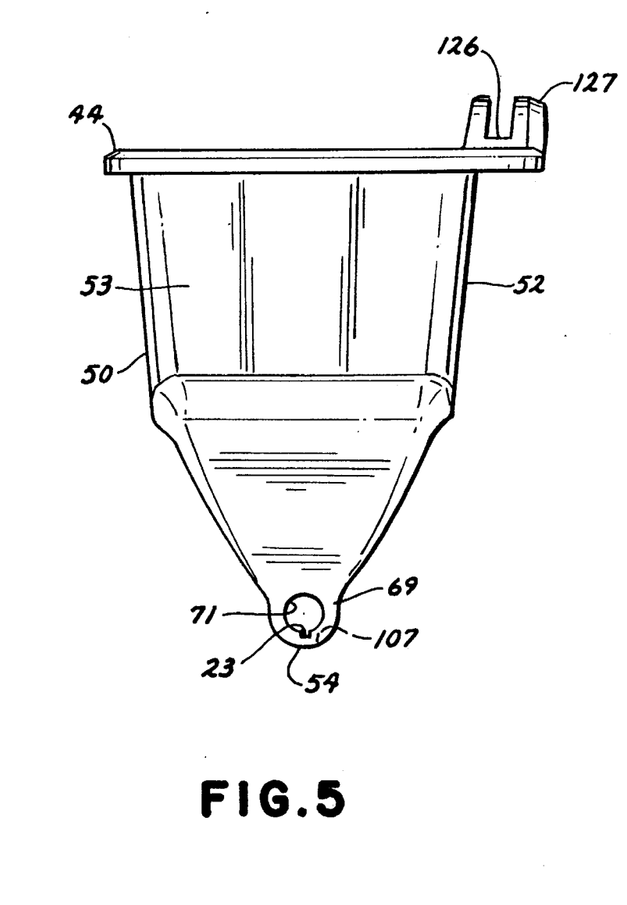
FIG. 5 is a side elevation of the hopper as depicted in FIG. 1.

Referring additionally to FIGS. 3,4 and 5, the hopper 44 will now be discussed in some detail. Hopper 44 is preferably molded from a plastic material such as polypropylene, but could advantageously be constructed of other materials, including metal, depending on the environment and application. The hopper 44 is formed so as to have a substantially rectangular upwardly facing opening 49. Fertilizer, seed, salt or other granular substances can be placed within the hopper via opening 49, either by emptying the contents of a bag into the hopper 49, or by slitting the bottom of the bag and placing the bag itself directly into the hopper. The opening 49 is created by the intersection of front wall 50, right side wall 51, rear wall 52 and left side wall 53. The front wall 50 is formed so as to include a series of inwardly facing channels, such as, for example channels 55, 56, 57, 58, 59, 60 and 61. A similar array of inwardly facing channels 62, 63, 64, 65, 66, 67 and 68 are formed within rear wall 52. The walls 50–53 taper downwardly so as to intersect at and form a semicylindrical bottom surface 54.

The bottom surface 54 includes sidewalls 69 and 70, which join left side wall 53 and right sidewall 51, respectively. Sidewall 69 is formed to include an orifice 71, while sidewall 70 is formed to include a coaxially aligned orifice 72, through which axle 43 passes. Keyholes 23 are formed within the perimeters of each orifice 72 and 71 (see FIG. 5) as an antirotation element.

The bottom surface 54 also includes a series of orifices 73, 74, 75, 76, 77, 78, 79, 80, 81, 82, 83 and 84, which have the outline of a triangular portion joined to a rectangular portion, giving them the appearance of "home plate". The triangular, or "pointed" portion is oriented so as to face forwardly in the direction of the mower 1, while the rectangular, or "blunt" portion is oriented towards the rear wall 52 of the hopper 44. The granular material within the hopper 44 is ultimately discharged onto the ground through the orifices 73–84.

Overlying the openings 73–84 is the axle 43, upon which is placed near each end 41 and 42, a bushing 107 and 85, respectively, which has a cylindrical outer surface. Each end of the bushing, for example ends 93 and 86, respectively, fits within, for example, support member 108 and 87. The support member 87 abuts a thrust washer 88, the thrust washer 88 abutting four vanes including vanes 89, 90 and 91, for example, such as are seen protruding from inner hub 92 of wheel 9. The end 41 of the axle, for example, protrudes somewhat beyond the end 93 of the bushing 85 and passes through gear 94 to be securely retained by retainer 95 and screw 96. Within the hopper 44, a pair of axle bushing members 97 and 98 support the axle 43 as the axle passes through orifices 72 and 71, respectively. Within the interior of the hopper itself, the axle 43 is not covered by bushings 107 and 85.

Rather, residing within hopper 44, and mounted coaxially with axle 43 is an impeller 99, which includes a central bore of a shape and size so as to receive the axle 43. As the axle 43 rotates, so does the impeller 99, thereby urging the fertilizer within hopper 44 toward orifices 73–84 located along the bottom surface 54. The impeller 99 is formed so as to include a series of, for example, six vanes 100, 101, 102, 103, 104 and 105, the vanes having a length so as to cause them to abut the inner surface 106 of retaining member 98 and the inner surface (not visible) of retaining member 97. In one embodiment, the vanes 100–105 are formed so as to be parallel to the axle 43. That is, each end of each vane, as well as all points along the length of the vane, reside on a single straight line.

The height of each vane 100–105 is such as to provide a clearance of approximately 0.030 inch between the outer tip of each vane and the inner surface 216 of bottom surface 54. The impeller 99 is preferably composed of a resilient plastic material, such as soft polyvinylchloride, such that the tip region of each vane 100–105 will deform to permit passage of oversized fertilizer particles rather than bind or jam the entire impeller 99. Ideally, however, the close tolerance between the tip of vanes 100–105 and the inner surface 216 of hopper 44 (see FIG. 3) is sufficient to prevent flow of granular material past the vanes. Thus, when the impeller 99 is not rotating, such as when the mower 1 is moved in a reverse direction, the vanes 100–105 act as a shut off valve, thereby preventing the flow of fertilizer to the bottom discharge openings 73–84 of hopper 44.

Figure 18:
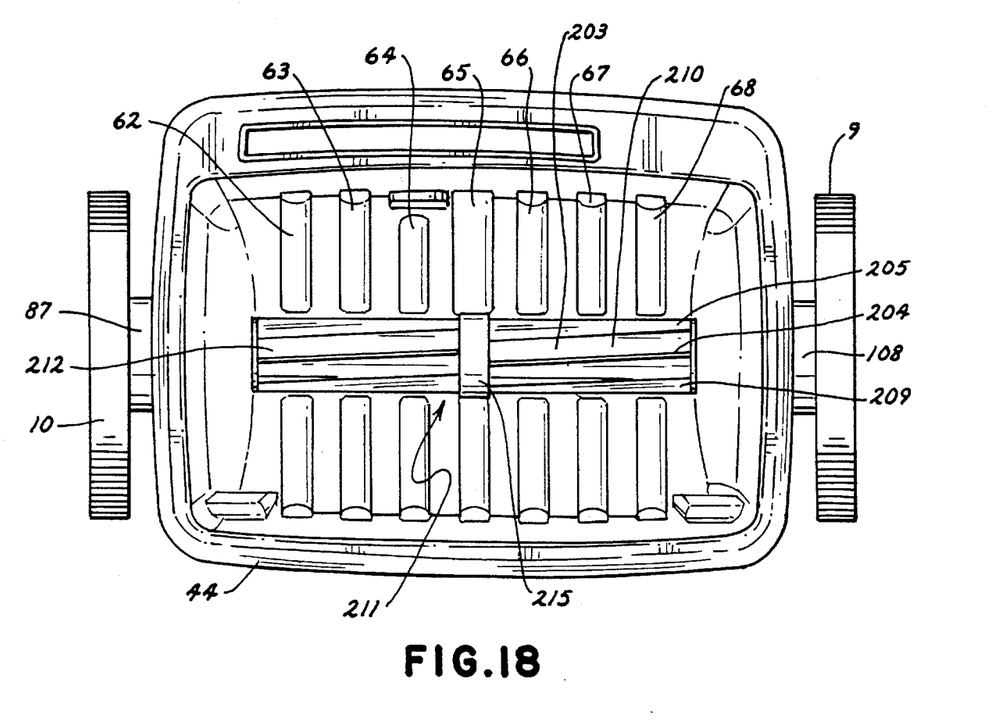
FIG. 18 is a plan view of an alternate embodiment of an impeller used in conjunction with the hopper depicted in FIG. 1.
Figure 19:
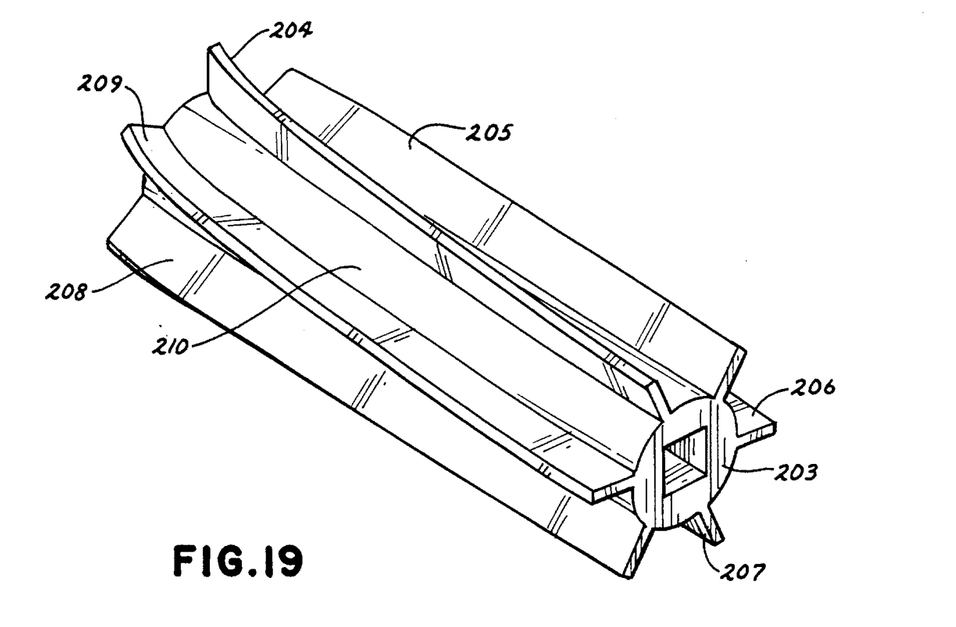
FIG. 19 is a perspective view of the impeller depicted in FIG. 18.

In an alternative embodiment depicted in FIGS. 18 and 19, the impeller 203 is formed such that each individual vane 204, 205, 206, 207, 208 and 209 follows the path of a helix having a longitudinal axis that is coaxial with the axle 43. That is, each successive point of each vane resides at a location that is at a successively greater angular displacement than the previous point as the vane extends along the perimeter 210 of the impeller surface. The advantage of this arrangement is that only a portion of each vane passes over the orifices 73–84 at any given moment.

With a rotating straight vane, the entire vane passes over all of the orifices simultaneously, meaning that the fertilizer is released in a pulsed fashion. Thus, the torque requirements encountered by the impeller 99 are also pulsed, being at a minimum when the fertilizer is actually being released through the orifices and being at a maximum prior to the orifices being reached by the fertilizer ahead of each vane. Further, the maximum available torque is being used to simultaneously push a large amount of fertilizer through all available orifices 73–84.

With a rotating helical vane, some set of orifices is always permitting the passage of the fertilizer that is being pushed by an intermediate portion of the vane, while at that same moment another set of orifices has just permitted passage of the fertilizer being pushed by a leading portion of the vane, and yet another set of orifices has not yet, but is just about to admit fertilizer being pushed by a trailing portion of the vane. Thus, the torque requirements imposed on the impeller are nearly constant, and the maximum available torque is available to push a relatively smaller amount of fertilizer through the available orifices. Granular material that has difficulty passing through an orifice does not resist the rotation of the impeller as is the case with a straight vane impeller, but rather the granular material is swept in a direction parallel to axle 43 so as to encounter the next set of orifices. Granular material is normally always smaller than the smallest size available at orifices 73–84, so blockages occur due primarily to the random clumping or packing of adjacent particles. The sweeping action of the impeller tends to reconfigure groups of particles until each particle is eventually able to pass through an orifice.

In another alternative embodiment depicted in FIG. 18, the impeller 211 is separated such that its longitudinal axis is divided into two substantially equal impeller segments 203 and 212. In this way, one impeller segment 212 is independently driven by mower wheel 7, and the other half of the impeller 203 is independently driven by mower wheel 8. The impeller halves 203 and 212 are joined by hub 215, within which they are both free to rotate about their common longitudinal axis. The impeller half 212 would, for example, overlie orifices 73–78 while the other half of the impeller 203 would overlie orifices 79–84. When the mower 1 is driven forward, both impeller halves 203 and 212 will normally rotate at the same speed, thereby dispensing substantially equal amounts of fertilizer through all of the orifices 73–84.

However, when mower 1 enters a turn to the left, for example, left mower wheel 8 is turning at a slower rate than right mower wheel 7. With a single piece impeller, drive wheel 10 turns at the faster rate dictated by mower wheel 7, and fertilizer is distributed at the relatively higher rate through all of the orifices 73–84. Since the mower 1 is in a left turn, the left side of the mower, and hence hopper 44, is traveling over a relatively lesser ground surface area than the right side of the hopper 44. With a single piece impeller, this turning condition results in a greater distribution per unit area, or flux, of fertilizer on the ground area under the left side of the hopper as compared to the fertilizer distributed under the right side of the hopper. When using the split impeller, the left mower wheel 8 (and hence left drive wheel 9) is moving at a slower rate and thus drives the left side of the impeller 203 at a slower rate. The right mower wheel 7 (and hence right drive wheel 10) is moving at a relatively higher rate and thus drives the right half of the split impeller 212 at a higher rate. In this way, the fertilizer flux on the ground under the left side of the hopper 44 is more nearly equal to the fertilizer flux on the ground under the right side of the hopper 44.

Supported beneath bottom surface 54 of hopper 44 is a flow adjuster 110. The adjuster 110 is formed as an elongated bar having mounting holes 111 and 112 at opposite ends. The mounting holes are supported by hopper bushings 97 and 98, respectively, thereby pivotally supporting adjuster 110 beneath orifices 73–84. When the adjuster 110 is near its lowest point beneath bottom surface 54, orifices 73–84 are completely sealed.

Near the middle of adjuster 110 is a tab 113, which permits the adjuster 110 to be pulled rearwardly away from mower deck 2, causing the adjuster 110 to pivot around hopper bushings 97 and 98 and move in the direction of arrow 114 (FIG. 3). As the adjuster 110 is initially pulled rearwardly, the "pointed" ends of orifices 73–84 are exposed. As rearward movement of adjuster 110 continues, the rectangular rear sections of the orifices are opened. In this way, a very small amount of fertilizer can be distributed in a precise manner. As larger amounts of fertilizer are desired, the orifices present progressively greater cross sections for a given rearward movement of the adjuster 110.

The tab 113 is pivotally attached to a connecting rod 115, one end 116 of which engages the tab 113 while the other end is formed as a prong 117 which is inserted through orifice 118 of lever 119. Lever 119 is formed to allow a compression spring 120 to be inserted between and retained by handle 121. The lever 119 is mounted by means of a screw 122 which passes sequentially through flat washer 123 and orifice 124 which is formed within rear wall 52 of hopper 44.

Clockwise rotation of the lever handle 121 causes prong 117 of connecting rod 115 to travel upwardly, thereby pulling adjuster 110 rearwardly. As previously discussed, the rearward movement of adjuster 110 progressively increases the available cross section of orifices 73–84, thereby increasing the flow of fertilizer from the hopper 44. One advantage achieved by the positioning of tab 113 near the center of adjuster 110, and in operating the adjuster 110 in the manner Just described, is that the edge 202 of adjuster 110 presents a uniform line that is always parallel to axle 43 and that cannot be warped or skewed as it moves across the orifices 73–84, thereby assuring that a substantially identical cross section of each of the orifices 73–84 is exposed for each position of the lever 119.

The lever handle 121 is retained within a slot 126 which is formed within lip 127, the lip 127 being an extension formed along the upper edge of rear wall 52. The rear portion 128 of lip 127 is inscribed with suitable scribe marks or other graphical information to indicate that the quantity of fertilizer dispensed is increased at the lever handle 121 is moved to the right.

Depending on the of material being dispensed from the hopper 44, a certain dispensing rate is usually determined through experience to be the maximum that should be permitted to occur without risking waste or over fertilization of some areas. This maximum dispensing rate may be set, and readjusted at will, by means of stop 129. Stop 129 slides along the lower surface 130 of lip 127, adjacent to slot 126, and is secured in place by screw 131 which passes through central opening 132 of stop 129 and subsequently engages knob 133. Knob 133 may be tightened and loosened by hand, and is mounted so as to be slidable along the upper surface of the lip 127 adjacent to slot 126.

The fertilizer, once it exits the hopper 44 through orifices 73–84, drops by gravity onto discharge chute 134, which will now be discussed in some detail with particular reference to FIGS. 2, 6, 7, 8 and 9. The discharge chute 134 is ideally formed as a single, molded polypropylene member. The chute 134 includes a right side mounting hook 135 which engages hopper bushing 97 adjacent to the hopper 44. Similarly, chute 134 also includes a left side mounting hook 136 which engages hopper bushing 98 adjacent to hopper 44. When in use, chute 134 is mounted behind mower 1 and beneath hopper 44 as shown in FIG. 1 such that the upper region 137 of chute 134 underlies orifices 73–84. The lower surface 150 of chute 134 is inclined with respect to the ground at an angle of approximately forty five degrees.

Figure 6:
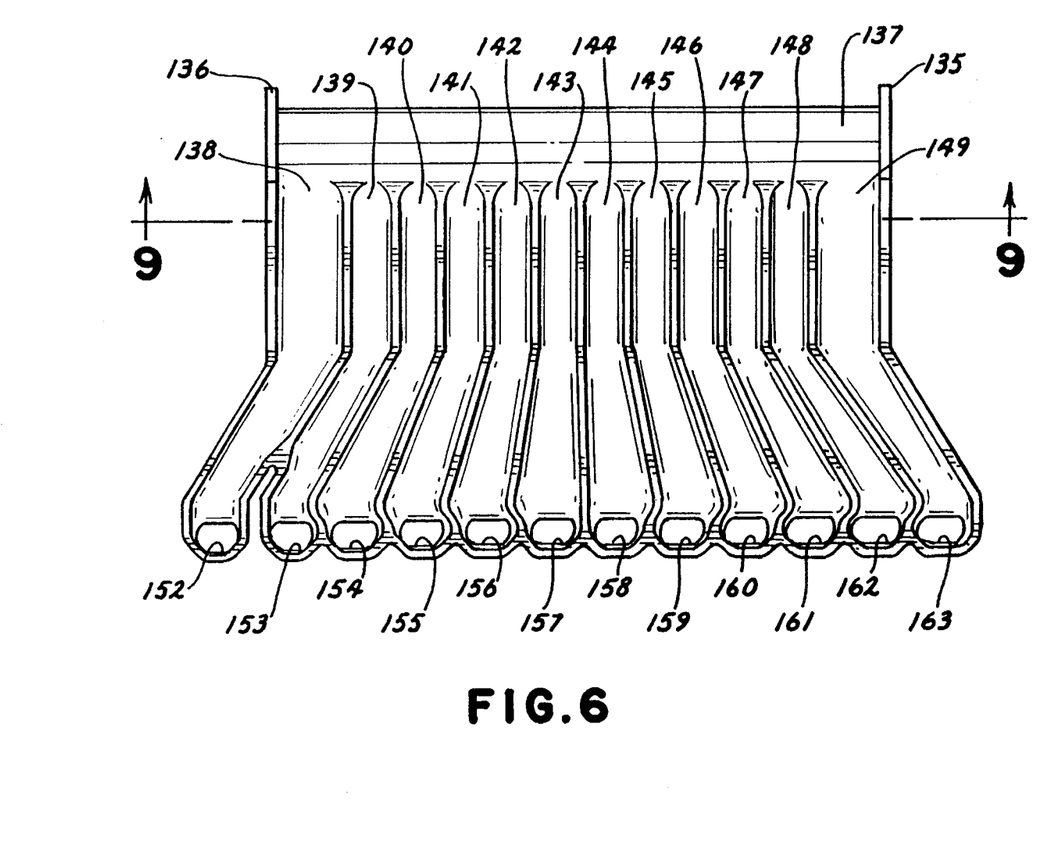
FIG. 6 is a top elevation of the discharge chute as depicted in FIG. 1.
Figure 7:
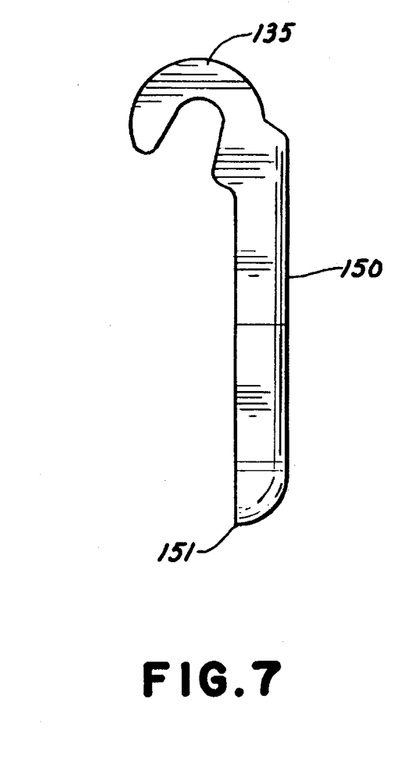
FIG. 7 is a side elevation of the discharge chute as depicted in FIG. 1.

The fertilizer (not shown), upon reaching upper region 137 of the chute 134 is urged downwardly by gravity into a series of open channels 138, 139, 140, 141, 142, 143, 144, 145, 146, 147, 148 and 149. Each of the channels 138–149 terminates at the lower edge 151 of the chute 134. The upper region 137 has a width that is slightly greater than the width of hopper 44, this width being somewhat less than the width of mower deck 2 in order that the hopper 44 will fit through the plane or opening outlined by mower handle 3. In one preferred embodiment, the lower edge 151 is approximately equal to the distance between the insides of the mower wheels 7 and 8, this distance being somewhat narrower than the mower cutting width.

The thickness of lower edge 151 is approximately 0.125 inch. Formed within bottom surface 150 and offset slightly from lower edge 151 is a series of discharge orifices, each orifice being contained entirely within one of the channels 138–149. Thus, the discharge orifices 152, 153, 154, 155, 156, 157, 158, 159, 160, 161, 162 and 163 correspond to one of each of the channels 138–149, respectively.

Figure 8:
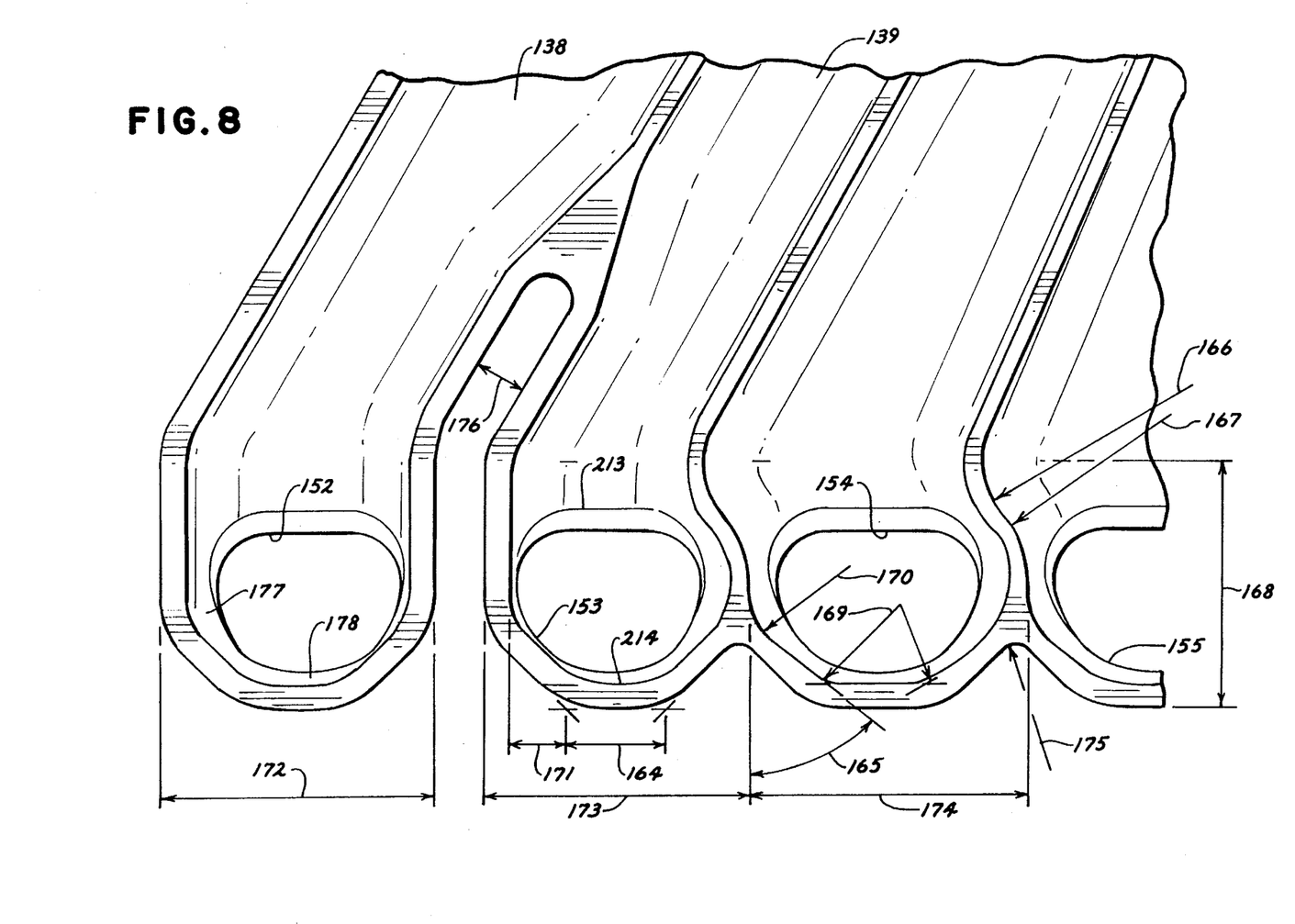
FIG. 8 is a detail of the circled area of FIG. 6 showing the configuration of the outlet orifices of the discharge chute.
Figure 9:
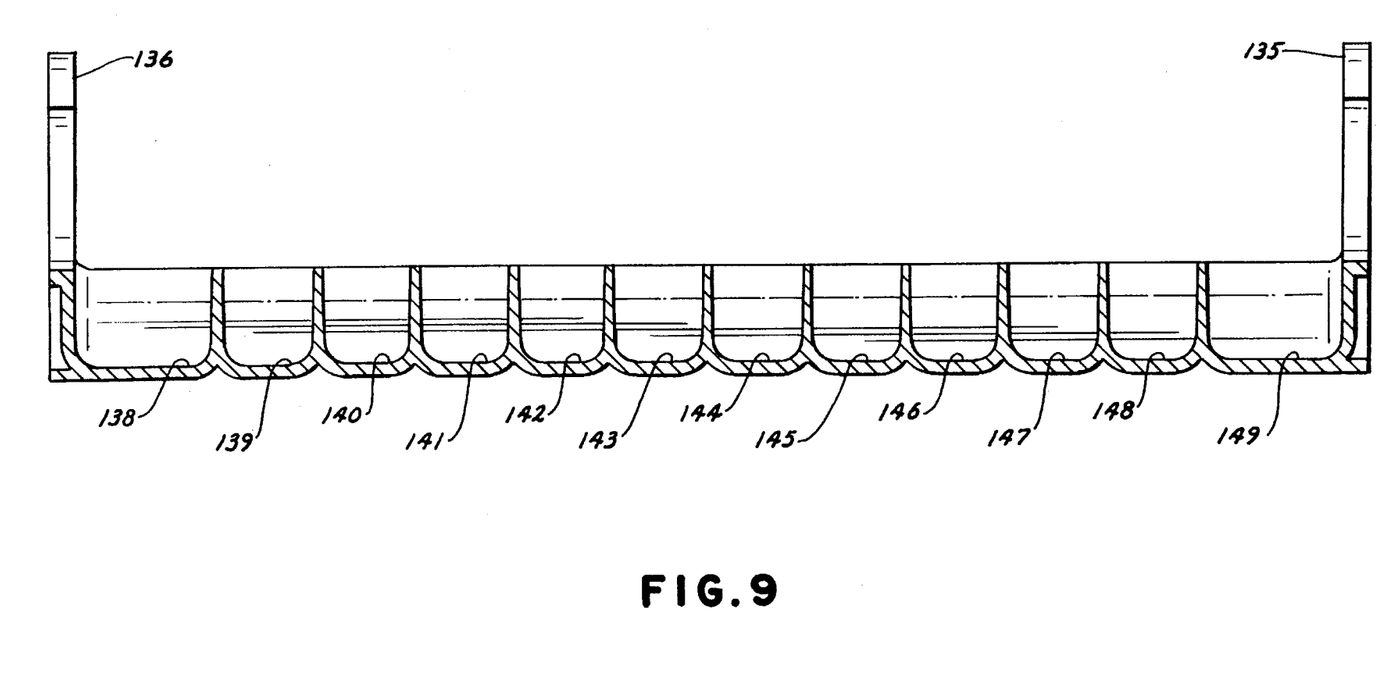
FIG. 9 is a sectional view taken along line A—A of FIG. 6.

Referring to FIG. 8, the discharge orifices 152–155 are seen in more detail. Each discharge orifice is shaped slightly differently in order to accommodate the diverging shape of each individual channel, but the dimensions given herein are typical for each orifice. The orifices 152–155 are somewhat trapezoidal in shape, having a base 213 oriented in the direction of forward mower travel and a somewhat rounded "apex" 214 oriented rearwardly. The width 164 is approximately 0.50 inch and the arc 165 is approximately fifty two degrees. The radius 166 is approximately 0.40 inch, while the radius 167 is approximately 0.49 inch. Length 168 is approximately 1.21 inch, radius 169 is approximately 0.37 inch and radius 170 is approximately 0.40 inch. The offset 171 is approximately 0.28 inch. As an example of the slight variations between individual channels, width 172 is approximately 1.35 inch, width 173 is approximately 1.30 inch and width 174 is approximately 1.38 inch. The radius 175 is approximately 0.06 inch. A gap 176, having a width of approximately 0.25 inch, exists between channel 138 and 139 order to accommodate the mower cables (not shown).

The guiding principle in determining the shape of each of the outlet orifices 152–163 is to prevent the depositing of individual lines or streaks of fertilizer from the discharge chute. Rather, the fertilizer should be evenly sprinkled over the entire width of each individual channel. Thus, examining channel 138, for example, the discharge outlet 152 is made wide enough to prevent the discharged fertilizer from being confined to a narrow line. The region surrounding orifice 152 includes an inclined sidewall 177 as well as an inclined backwall 178. In the absence of these sidewall regions, any sideways tilt of the chute would cause most of the discharged fertilizer to be distributed to one side of the path underlying orifice 152. The sidewalls cause the fertilizer, when distributed under such conditions, to be vectored or diverted for some distance around the perimeter of orifice 152, thereby exiting the orifice 152 at a more random location based on the individual velocity of each granular particle. Similarly, backwall 178 is shaped and dimensioned to deflect the particles around the orifice 152 until they lose enough kinetic energy to fall through the orifice.

Referring additionally to FIGS. 10–16, the attachment of the hopper 44 to the mower handle 3 will now be discussed. As seen in FIG. 10, a knob 179 is inserted through one side of the handle 3 and secured by a suitable nut (not shown). The knob 179 is located so as to be at a height above the ground that is approximately equal to the height of the midregion of the hopper 44 when the hopper 44 is mounted in its intended position of use, that is, when drive wheel 9 is in contact with mower wheel 8.

A mounting rod 180, having a "hairpin" portion 181, is engaged with knob 179, such that the hairpin portion 181 may be slidably adjusted and then secured by knob 179. The other end 182 of the rod 180 is inserted through orifice 184 on the right side of hopper 44 (see FIG. 2), the mounting rod 180 continuing until bottoming out on the bottom surface 217 of orifice 184. One region 185 of the mounting rod 180 is shaped so as to include a guide for the mower recoil rope (not shown) to be retained within.

While the aforementioned rod 180 is adequate for keeping the upper edge 186 of hopper 44 substantially level, the frictional engagement between drive wheel 9 and mower wheel 8 is dependent almost entirely on the weight of the hopper 44 and its contents. When the hopper 44 is relatively empty, and since hopper 44 is preferably constructed of a lightweight plastic, the downward force provided on drive wheel 9 may be inadequate to provide reliable contact with mower wheel 8.

In order to address the aforementioned problem, a biasing attachment spring 187 is provided. The attachment spring 187 is preferably composed of a stiff, resilient material such as a stainless or spring steel rod, so that the attachment spring 187 will supply a substantial reactive force when displaced from its nominal configuration.

The attachment spring 187 includes a handle gripping portion 188 and a clamp engaging end 189. In use, the attachment spring 187, with the exception of portion 188, resides in a substantially vertical plane. The handle gripping portion 188 wraps around approximately one hundred eighty degrees of the perimeter of handle 3 in the region 190 of the handle 3 that is adjacent to the mower deck attachment point 191. A hopper gripping portion 192 of spring 187 is curved so as to have a radius, in a preferred embodiment, of approximately 1.18 inches. This creates a shape and size for hopper gripping portion 192 that snugly engages support member 108 which surrounds the axle 43.

Figure 14:
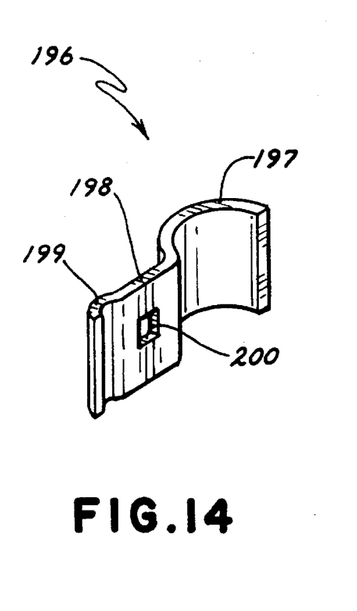
FIG. 14 is a perspective view of one half of a clamp used to secure the attachment spring depicted in FIG. 11.
Figure 15:
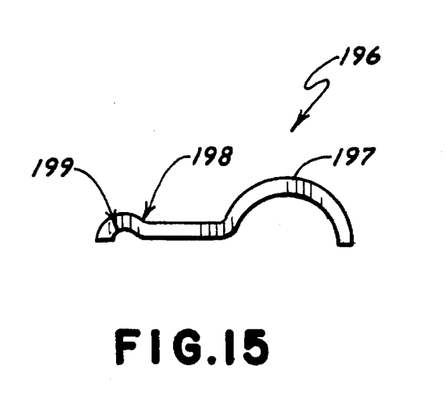
FIG. 15 is a side elevation of the clamp depicted in FIG. 14.
Figure 16:
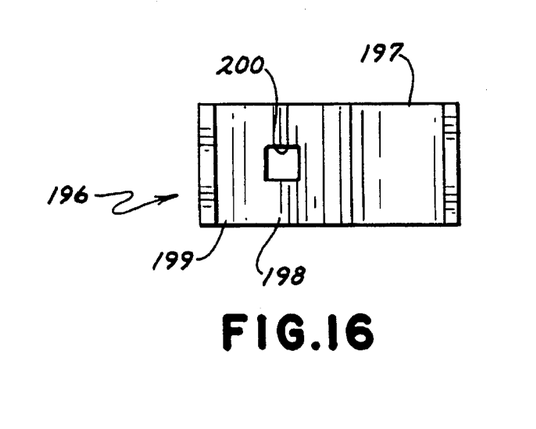
FIG. 16 is a plan view of the clamp depicted in FIG. 14.

The hopper gripping portion 192 transitions to a sharp bend 193 which again curves to form biasing portion 194. The biasing portion 193 ends with clamp engaging end 189. The clamp 195 is formed from two substantially identical halves 196, as seen in FIG. 14. Each clamp half 196 is formed to include a substantially semicircular handle engaging segment 197, a contiguous, substantially flat fastening portion 198 and a spring engaging portion 199. The two halves are fastened together to form clamp 195 by affixing a suitable fastener (not shown) through square hole 200. The position of clamp 196 as well as the resultant frictional engagement force between the mower wheels 7 and 8 and the drive wheels 9 and 10 may be adjusted by sliding the clamp 195 along mower handle 3. The clamp 195 is moved downwardly along handle 3 a sufficient distance so that when the end 189 of the biasing member 187 is secured with the clamp 195, the biasing member 187 is somewhat compressed, thereby exerting a biasing force in the direction of arrow 201. The direction of the biasing force is such as to urge drive wheel 9 into solid frictional contact with mower wheel 8.

Figure 17:
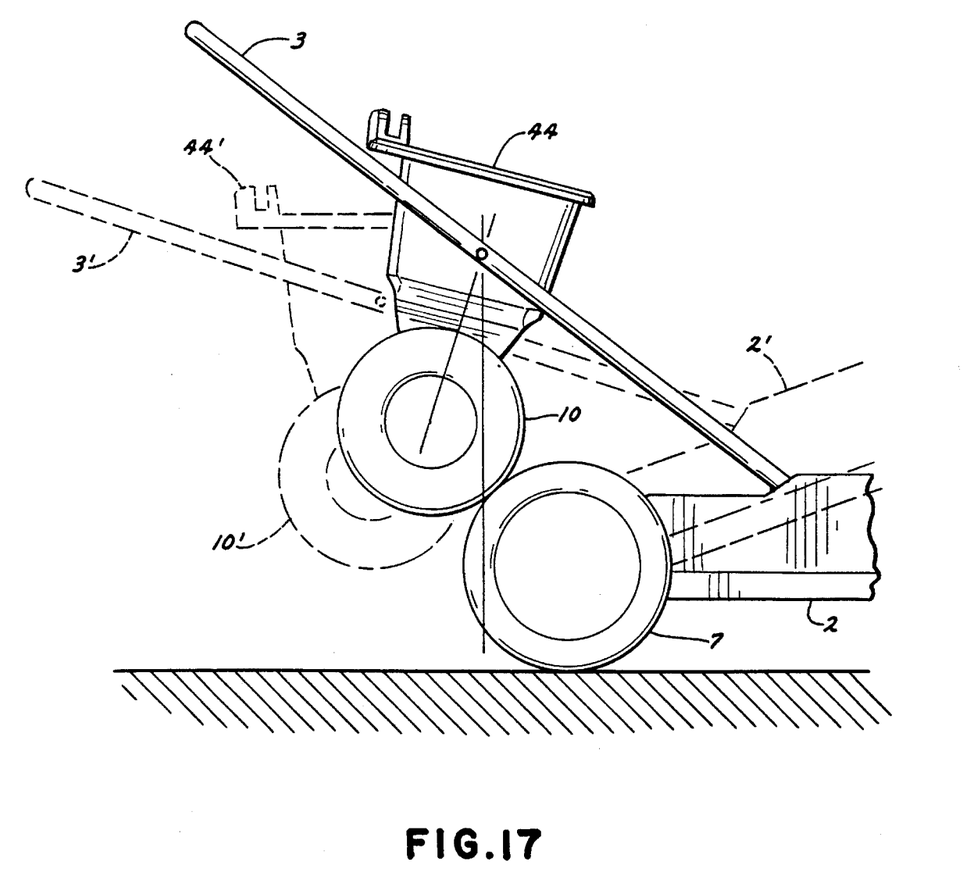
FIG. 17 is a side elevation of an alternate embodiment of a hopper constructed according to the principles of the present invention.

Although certain preferred embodiments of the present invention have been set forth in detail, the invention is subject to many variations which remain within the scope of the following claims. For example, the geometry of the hopper and its drive wheels could be adjusted so that the hopper was located further behind the mower deck, thereby permitting the drive wheels to make direct contact with the ground. The hopper and discharge chute would therefore follow the mower in a trailering, rather than in a suspended, arrangement. Alternatively, referring to FIG. 17, the geometry would be such that an extreme downward force on the mower handle 3, such as occurs when tilting the mower deck rearwardly or in sharp turns, would disengage the drive wheels 9 and 10 and the mower wheels 7 and 8, thereby eliminating the need for the pawl/clutch arrangement. Other similar variations of the present invention will be apparent to those skilled in the art.

We claim:

1. A granular material spreading apparatus, comprising:
   (a) a discharge chute, the discharge chute having a first edge, a second edge and a bottom surface, the second edge being adapted to distribute the granular material onto an area of ground with substantially uniform density per unit of ground area that is traversed by the discharge chute;
   (b) a hopper, the hopper having a first opening and a plurality of hopper discharge openings, the first hopper discharge opening being adapted to receive the granular material, the hopper discharge openings being adapted to deposit the granular material adjacent to the first edge of the discharge chute;
   (c) a series of diverging open channels, the diverging open channels having a first width in a region near the first edge of the discharge chute, the diverging open channels having a second width in a region abutting the second edge of the discharge chute, the first width being less than the second width; and
   (d) a plurality of chute discharge openings formed in the bottom surface of the discharge chute such that one chute discharge opening is formed in the bottom surface of the discharge chute underlying each diverging open channel, each chute discharge opening being located along the second edge of the discharge chute and having a width that is more than half the second width of the diverging open channel in which the discharge opening is formed.

2. The granular material spreading apparatus of claim 1, wherein each diverging open channel is formed so as to have a first side wall, a second side wall and a back wall, each wall having a height that is sufficient to substantially prevent any of the granular material within any open channel form exiting the open channel by passing over the first side wall, the second side wall and the back wall.

3. A granular material spreading apparatus comprising:
   (a) a discharge chute, the discharge chute having a first edge and a second edge, the second edge being adapted to distribute the granular material onto an area of ground with substantially uniform density per unit of ground that is traversed by the discharge chute;
   (b) a hopper, the hopper having a first opening and at least one hopper discharge opening, the first hopper discharge opening being adapted to receive the granular material the hopper discharge opening being adapted to deposit the granular material onto the first edge of the discharge chute;
   (c) a series of diverging open channels, each diverging open channels comprising:
      (i) a first width in a region near the first edge of the discharge chute;
      (ii) a second width in a region near the second edge of the discharge chute, the first width being less than the second width;
      (iii) a first side wall having a height that is sufficient to substantially prevent any of the granular material within each open channel form exiting the open channel by passing over the first side wall;
      (iv) a second side wall having a height that is sufficient to substantially prevent any of the granular material within each open channel from exiting the open channel by passing over the second side wall;
      (v) a back wall having a height that is sufficient to substantially prevent any of the granular material within each open channel form exiting the open channel by passing over the back wall; and
      (vi) a bottom surface residing between the first and second side walls; and
   (d) a plurality of downwardly opening chute discharge orifices, each downwardly opening chute discharge orifice being formed in the bottom surface of each diverging open channel along the second edge of the discharge chute, each downwardly opening chute discharge orifice having a continuous perimeter defining a radiused edge, the radiused edge joining each wall of the open channel in which each downwardly opening chute discharge orifice is formed.

4. The granular material spreading apparatus of claim 3, wherein each chute discharge orifice is substantially trapezoidal in shape.

5. The granular material spreading apparatus of claim 4, wherein each chute discharge orifice is formed so as to have a trailing edge near the back wall of the discharge chute and a leading edge relatively farther away from the back wall than the trailing edge, the trailing edge being substantially parallel to the leading edge.

6. The granular material spreading apparatus of claim 5, wherein the discharge chute further comprises at least one hook, the hook being adapted to engage a portion of the hopper, the discharge chute thereby being supported in a cantilevered fashion such that motion of the hopper is transmitted to the discharge chute.

7. The granular material spreading apparatus of claim 6, wherein the first edge of the discharge chute has a first width and the second edge of the discharge chute has a second width, the first width being less than the second width, thereby permitting distribution of the granular material over a swath wider than the width of the hopper.

8. The granular material spreading apparatus of claim 7, wherein the discharge chute is inclined such that substantially all of the fertilizer deposited from the hopper into the discharge chute exits through the chute discharge orifices.

9. The granular material spreading apparatus of claim 8, wherein the discharge chute is inclined at an angle of approximately forty five degrees with respect to a horizontal surface when the mower is approximately level.

10. The granular material spreading apparatus of claim 9, wherein the discharge chute contains twelve diverging open channels and twelve chute discharge orifices.

11. A method of distributing granular fertilizer while operating a walk behind lawn mower, comprising the steps of:

(a) mounting a hopper behind the lawn mower such that a first pair of drive wheels rotatably affixed to an impeller within the hopper frictionally engages a second pair of rear mower wheels;

(b) resiliently urging the first pair of drive wheels into frictional engagement with the second pair of rear mower wheels; and (c) mounting at least one adjustable clamp onto a component of the lawn mower such that slidable adjustment of the clamp varies the frictional engagement between the first pair of drive wheels and the second pair of rear mower wheels.

* * * * *